United States Patent
Mohrin

(10) Patent No.: US 7,068,928 B2
(45) Date of Patent: Jun. 27, 2006

(54) METHOD AND APPARATUS FOR PHOTOGRAPHICALLY RECORDING AN IMAGE

(76) Inventor: Carl M. Mohrin, 552 Charlestown Rd., Hampton, NJ (US) 08827

( * ) Notice: Subject to any disclaimer, the term of this patent is extended or adjusted under 35 U.S.C. 154(b) by 182 days.

(21) Appl. No.: 10/920,782

(22) Filed: Aug. 18, 2004

(65) Prior Publication Data

US 2006/0039694 A1   Feb. 23, 2006

(51) Int. Cl.
G03B 17/50 (2006.01)
G03D 7/00 (2006.01)
G03C 1/00 (2006.01)

(52) U.S. Cl. .................. 396/30; 396/439; 396/579; 396/661; 430/495.1

(58) Field of Classification Search .............. 396/30, 396/439, 517, 527, 535, 579, 661; 430/495.1
See application file for complete search history.

(56) References Cited

U.S. PATENT DOCUMENTS

| 3,871,888 | A |  | 3/1975 | Michel-Wolwertz et al. .. 96/88 |
| 4,042,388 | A |  | 8/1977 | Inoue et al. ................... 96/1.6 |
| 4,065,310 | A |  | 12/1977 | Dujardin et al. ............ 96/27 R |
| 4,546,071 | A |  | 10/1985 | Fox ............................ 430/428 |
| 4,679,924 | A | * | 7/1987 | Wamsley ...................... 396/14 |
| 5,256,616 | A |  | 10/1993 | Heller et al. ................. 502/350 |
| 5,279,932 | A |  | 1/1994 | Miyasaka et al. ........... 430/495 |
| 5,305,031 | A | * | 4/1994 | Hayakawa .................... 396/26 |
| 6,434,881 | B1 |  | 8/2002 | Goldburt et al. ............... 47/17 |
| 6,492,149 | B1 |  | 12/2002 | Muller-Feuga ........... 435/173.8 |
| 6,509,188 | B1 |  | 1/2003 | Trösch et al. ............ 435/292.1 |

* cited by examiner

*Primary Examiner*—W. B. Perkey
(74) *Attorney, Agent, or Firm*—Watov & Kipnes, P.C.; Kenneth Watov

(57) ABSTRACT

A photographic imaging apparatus includes a housing defining an interior cavity, an opening at one end of the housing to allow light to enter the interior cavity, and a photographic imaging substrate located within the interior cavity opposite from the opening for receiving the light entering the interior cavity through the opening, the photographic imaging substrate including a light passing substrate, a photosensitive agent capable of producing oxygen in the presence of light, and precursor gas, the photosensitive agent being supported on the light passing substrate away from the opening, and exposable to light that has passed through the light passing substrate from the opening, and an oxidizable surface positioned in close association with the photosensitive agent, the oxidizable surface is chemically reactive, the reaction being enhanced by electric current, to yield a visual change or image upon exposure to oxygen produced by the photosensitive agent upon.

22 Claims, 4 Drawing Sheets

METHOD AND APPARATUS FOR PHOTOGRAPHICALLY RECORDING AN IMAGE

FIELD OF THE INVENTION

The present invention relates generally to photographic imaging apparatus, and more particularly to photographic imaging apparatus especially suitable for recording an image on a substrate via use of chlorophyll-based material.

BACKGROUND OF THE INVENTION

Several important natural substances are chelates. In chelates a central metal ion is bonded to a large organic molecule, a molecule composed of carbon, hydrogen, and other elements such as oxygen and nitrogen. One such chelate is chlorophyll, the green pigment of plants. In chlorophyll the central ion is magnesium, and the large organic molecule is a porphyrin. The porphyrin contains four nitrogen atoms that form bonds to magnesium in a square planar arrangement. There are several forms of chlorophyll including, for example, chlorophyll a.

Chlorophyll is one of the most important chelates in nature. It is capable of channeling the energy of sunlight into chemical energy through the process of photosynthesis. During photosynthesis, the energy absorbed by chlorophyll transforms carbon dioxide and water into carbohydrates and oxygen. The chemical energy stored by photosynthesis in carbohydrates drives biochemical reactions in nearly all living organisms.

In the photosynthetic reaction, carbon dioxide is reduced by water whereby electrons are transferred from water to carbon dioxide. Chlorophyll assists this transfer. When chlorophyll absorbs light energy, an electron in chlorophyll is excited from a lower energy state to a higher energy state. In this higher energy state, this electron is more readily transferred to another molecule. This starts a chain of electron-transfer steps, which ends with an electron transferred to carbon dioxide. Meanwhile, the chlorophyll, which gave up an electron can accept an electron from another molecule. This is the end of a process, which starts with the removal of an electron from water. Thus, chlorophyll is at the center of the photosynthetic oxidation-reduction reaction between carbon dioxide and water.

There is a need for a photographic imaging apparatus, which utilizes a photosensitive agent capable of producing oxygen when exposed to light. There is a further need for a photographic imaging apparatus that is more environmentally friendly, cost efficient to implement, and relatively simple to make and use.

SUMMARY OF THE INVENTION

The present invention relates generally to a photographic apparatus and method of using the same for generating an image. The photographic apparatus is designed to be readily implemented using conventionally available reagents and equipment. The photographic apparatus of the present invention includes a housing defining an interior cavity, an opening at one end of the housing to allow light to enter the interior cavity, and a photographic imaging substrate located within the interior cavity opposite from the opening. The imaging substrate includes a light passing substrate for supporting a photosensitive agent capable of producing oxygen when exposed to light. The light passing substrate maintains the photosensitive agent in close association with an oxidizable surface. The oxidizable surface is composed of a material that is chemically reactive in the presence of oxygen to yield visual changes in the form of oxides or oxidation residues such as rust or tarnish.

Optionally, a precursor gas supply can be used to supply a precursor gas, which is chemically converted by the photosensitive agent into oxygen upon exposure to light. In a preferred embodiment, the photosensitive agent is chlorophyll.

In one aspect of the present invention, there is provided a photographic imaging substrate comprising:

a light passing substrate;

a photosensitive agent capable of producing oxygen in the presence of light, the photosensitive agent being supported on the light passing substrate, and exposable to light passing through the light passing substrate; and an oxidizable surface positioned in close association with the photosensitive agent, the oxidizable surface being chemically reactive to yield a visual change upon exposure to oxygen produced by the photosensitive agent.

In another aspect of the present invention, there is provided a photographic imaging apparatus comprising:

a housing defining an interior cavity;

an opening at one end of the housing to allow light to enter the interior cavity; and a photographic imaging substrate located within the interior cavity opposite from the opening, the photographic imaging substrate including:

a light passing substrate;

a photosensitive agent capable of producing oxygen in the presence of light, the photosensitive agent being supported on the light passing substrate away from the opening, and exposable to light passing through the light passing substrate from the opening; and an oxidizable surface positioned in close association with the photosensitive agent, the oxidizable surface being chemically reactive to yield a visual change in the form of an image upon exposure to oxygen produced by the photosensitive agent.

In a further aspect of the present invention, there is provided a method of producing a photographic image, comprising:

placing on a light passing substrate a photosensitive agent capable of producing oxygen upon exposure to light;

positioning the photosensitive agent in sufficient proximity to and in atmospheric communication with a corresponding oxidizable surface, wherein the oxidizable surface is chemically reactive to yield a visual change upon exposure to oxygen; and exposing the photosensitive agent to light through the light passing substrate for a sufficient time to generate an image in the oxidizable surface.

BRIEF DESCRIPTION OF THE DRAWINGS

Various embodiments of the invention are described in detail below with reference to the drawings, in which like items are identified by the same reference designations, wherein.

DETAILED DESCRIPTION OF THE INVENTION

The present invention is directed to a photographic imaging method and apparatus adapted for photographically recording an image using a photosensitive agent capable of producing oxygen upon exposure to light, in combination, with an oxidizable surface. The photographic imaging apparatus of the present invention generally includes a housing defining an interior cavity, an opening at one end of the housing to allow light to enter the interior cavity, and a photographic imaging substrate located within the interior cavity opposite from the opening for receiving the light passing through the opening. The imaging substrate includes a light passing substrate for supporting a photosensitive agent capable of producing oxygen upon exposure to light, in combination, with an oxidizable surface. The light passing support maintains the photosensitive agent in close atmospheric association with the oxidizable surface. The oxidizable surface is maintained in a chemically reactive state to yield a visual change upon exposure to oxygen generated by the photosensitive agent. The visual change is generally visible upon formation of an oxidation residue or oxide such as rust or tarnish. The photographic imaging apparatus is relatively simple to fabricate and implement using currently available components. The image generating components of the photographic imaging apparatus is safe, non-toxic and environmentally friendly.

Figure 1:
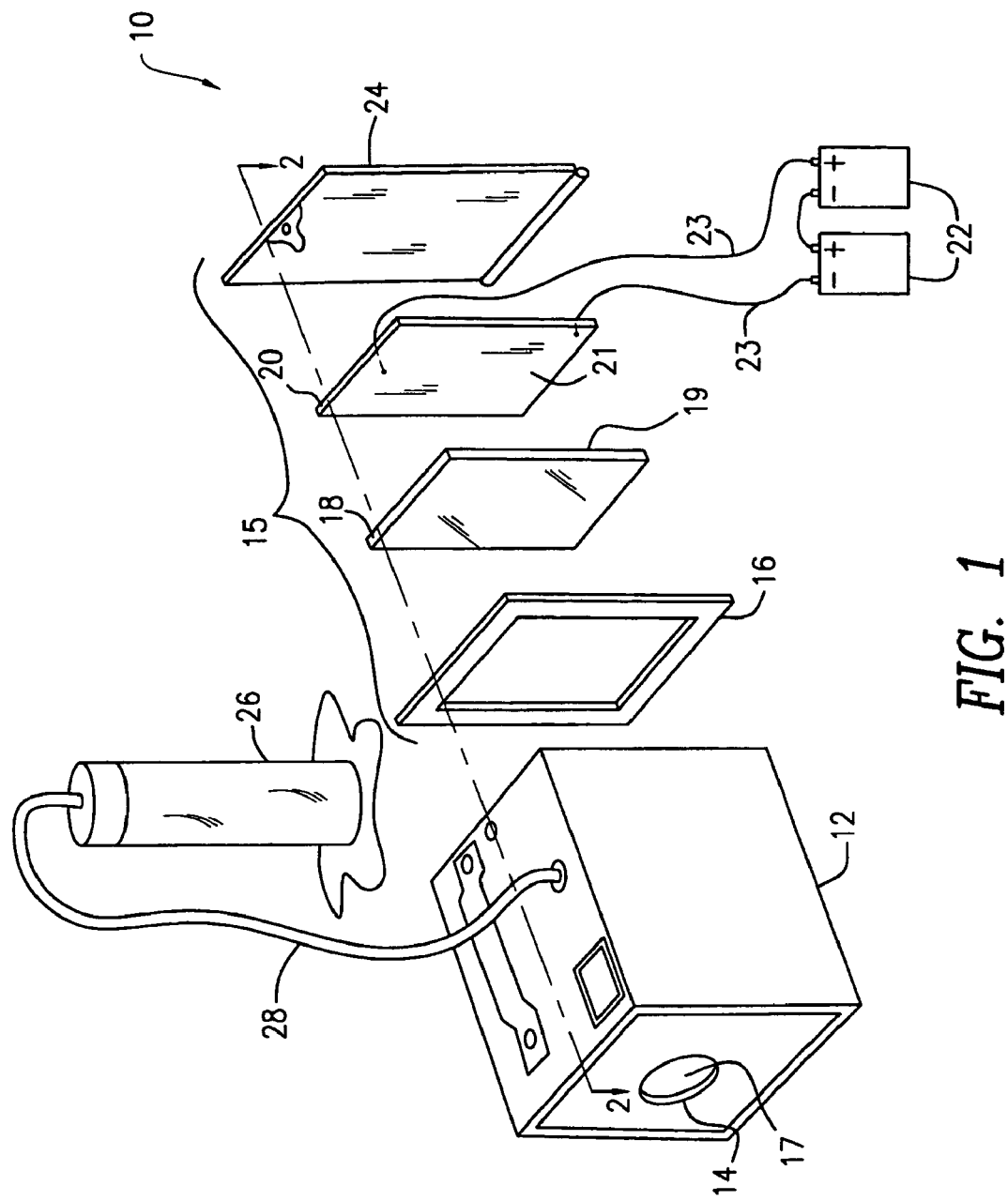
FIG. 1 is an exploded assembly view of a photographic imaging apparatus utilizing a photosensitive agent capable of producing oxygen in the presence of light for one embodiment of the present invention.

With reference to FIG. 1 of the drawings, a photographic imaging apparatus generally identified by reference numeral 10 is shown for one embodiment of the present invention. The photographic imaging apparatus 10 includes a housing 12 defining an interior cavity 13 (as shown best in FIG. 2), an opening 14 at one end of the housing 12, and an imaging portion 15 forming an end portion of the housing 12 opposite from the opening 14. The imaging portion 15 includes a series of layers that are positioned in a stacked arrangement and oriented to receive light entering the interior cavity 13 through the opening 14 to generate an image. The opening 14 includes a lens 17 or a pinhole for focusing a light image on the photosensitive imaging portion 15.

The imaging portion 15 is composed of a matte 16, a light passing substrate 18 having a support surface 19, an oxidizable plate 20 having an oxidizable surface 21, and a closure flap 24 for enclosing the housing 12. The components of the imaging portion 15 are maintained in a stacked arrangement when mounted within the interior cavity 13 of the housing 12. The oxidizable plate 20 is electrically connected to a battery source 22 via electrical wires 23 to promote the image generating process of the present invention. The oxidizable plate 20 is composed of any suitable oxidizable material, which chemically reacts to the presence of oxygen and yields a permanent visible change through the formation of oxides or oxidative residues such as rust or tarnish. Such oxidizable material can be selected from a range of oxidizable metals and alloys thereof. In a preferred embodiment, the oxidizable material is iron and alloys thereof.

The photographic imaging apparatus 10 further includes a container 26 for supplying to the interior cavity 13 a precursor gas i.e. ($CO_2+H_2O$) via a tubular conduit 28, for example. The precursor gas i.e. ($CO_2+H_2O$) enhances the production of oxygen by the photosensitive agent during operation.

Figure 2:
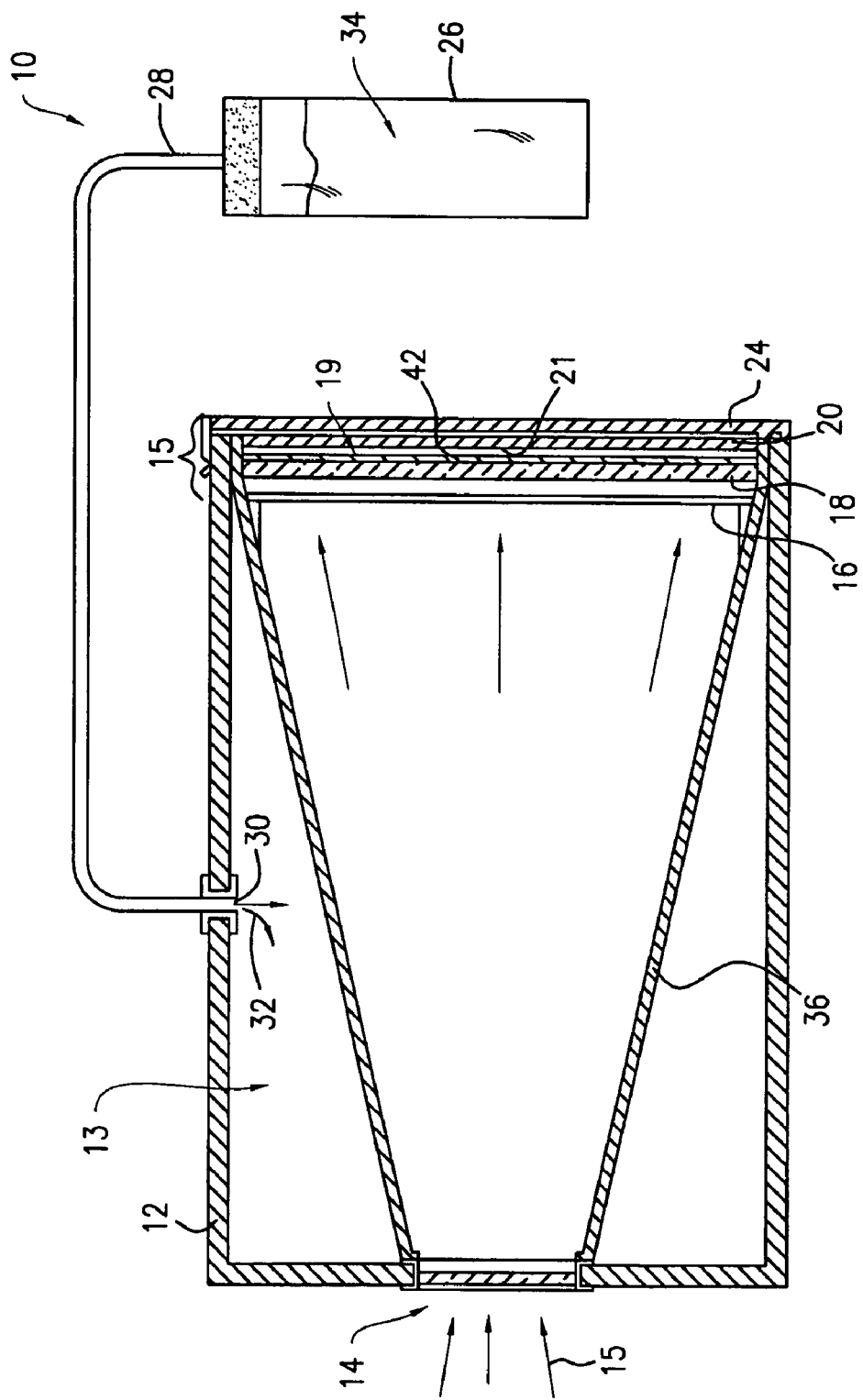
FIG. 2 is a cross sectional view taken along 2—2 of the photographic imaging apparatus of FIG. 1 in an assembled state.

Referring to FIG. 2, the photographic imaging apparatus 10 includes a baffle 36 for maintaining the imaging portion 15 in position at one end of the housing 12 opposite from the opening 14 within the interior cavity 12. A material containing a photosensitive agent is applied to form a photosensitive layer on the support surface 19 of the light passing substrate 18, which is made from transparent material, such as glass or plastic, for example. The photosensitive agent is a substance that produces oxygen upon exposure to light. In this manner, when a portion of the photosensitive agent is exposed to light, oxygen is generated only at that portion of the photosensitive agent illuminated. The photosensitive agent can be selected from a range of substances including, but not limited to, chlorophyll. In the preferred embodiment of the present invention, the photosensitive agent is chlorophyll. The photosensitive agent may be retained in a support medium that facilitates retainment on the support surface 19 of the substrate 18. In one embodiment, the photosensitive agent (i.e., chlorophyll) can be applied to the support surface 19 of the light passing substrate 18 by taking fresh green plant matter and applying it to the surface 19.

The photographic imaging apparatus 10 is designed to permit information about the image in the form of light 15 to pass though the opening 14 and the interior cavity 13 of the housing 12 where it is received by the imaging portion 15. The imaging portion is retained at the front and back ends by the matte 16 and the closure flap 24, respectively. The light 15 thereafter passes through the light passing substrate 18 to the photosensitive agent supported thereon. This initiates the image generation process of the apparatus 10 as will be further described in detail below.

The precursor gas container 26 retains a precursor gas source 34 for supplying a precursor gas 32 into the interior cavity 13 through the conduit 28. The proximal end of the conduit 28 is connected to the container 26, and the distal end of the conduit 28 is connected to a port 30 of the housing 12. As the precursor gas 32 diffuses throughout the interior cavity 13, the light activated photosensitive agent converts the precursor gas 32 into oxygen gas during the image generating process of the present invention. In one embodiment of the present invention where the photosensitive agent is chlorophyll, the container 26 contains a gas source 34 for generating carbon dioxide and water vapors, such as, for example, carbonated water.

Figure 3:
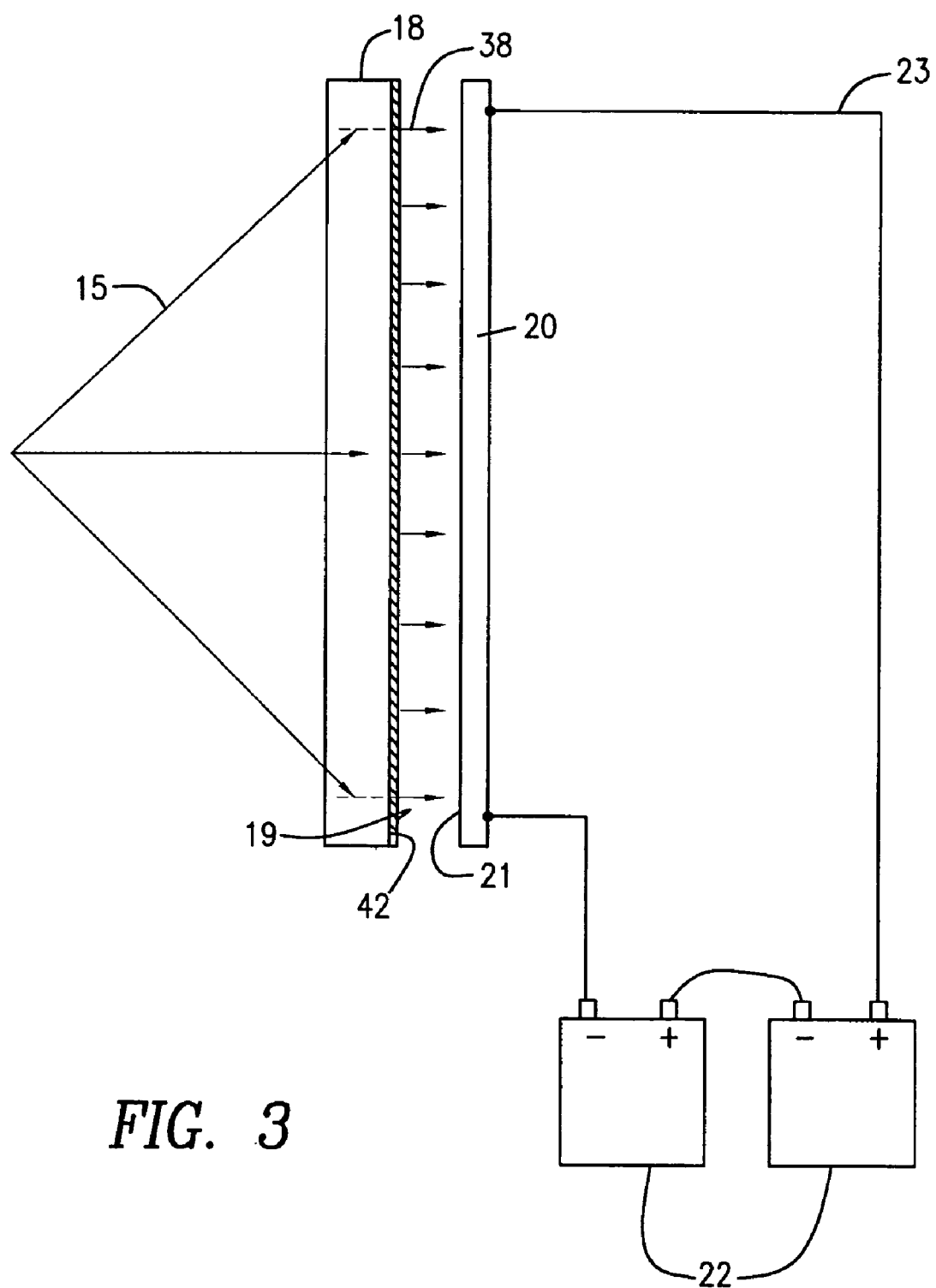
FIG. 3 is a schematic diagram of an imaging portion of the photographic imaging apparatus illustrating the image generating process for one embodiment of the present invention.

Referring to FIG. 3, a schematic diagram of the imaging portion 15 is shown to illustrate the image generating process of the photographic imaging apparatus 10 for one embodiment of the present invention. The light passing substrate 18 includes a photosensitive layer 42 containing the photosensitive agent (e.g., chlorophyll). As light 15 passes through the light passing substrate 18, the light 15 illuminates portions of the photosensitive layer 42. The illuminated portions of the photosensitive layer 42 produce greater amounts of oxygen 38 than the non-illuminated portions of the photosensitive layer 42. The oxygen generated at the localized areas moves to a corresponding point on the oxidizable surface 21 of the oxidizable plate 20, whereby oxidation occurs on the surface 21. The oxidation produces a visual change in the surface 21 upon formation of an oxide such as rust or tarnish. The amount of oxidation on the surface 21 correlates with the amount of light present at a localized area on the photosensitive layer 42. As a result, the oxidizable plate 20 yields a general image produced by the oxidative process.

To enhance the oxidation process, the oxidizable plate 20 is electrically connected via the electrical wiring 23 to the battery source 22, which may comprise, for example, two 9-volt batteries connected in series. The battery source 22 supplies electrons to the surface 21 for enhanced reactivity.

Figure 4:
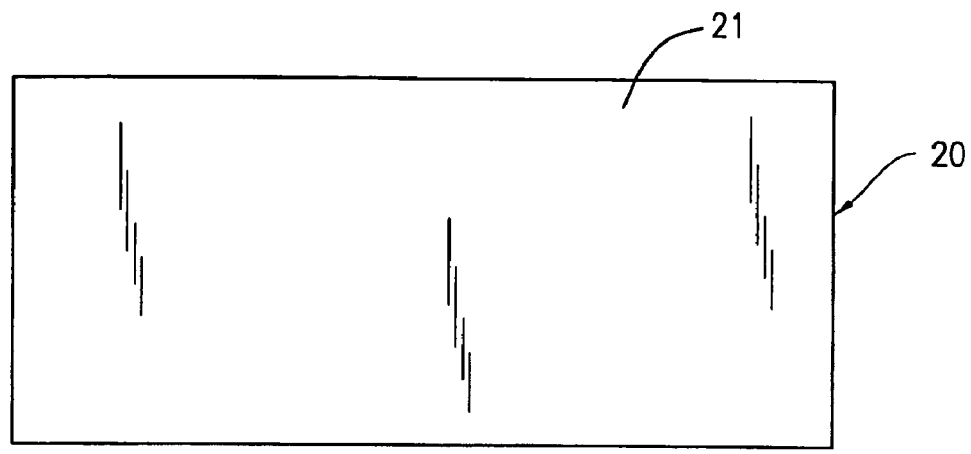
FIG. 4 is front elevation view of an imaging plate having an oxidizable surface prior to being mounted within the photographic imaging apparatus.

Referring to FIG. 4, an oxidizable plate 20 is shown having a clear surface 21 prior to being processed by the photographic imaging apparatus 10.

Figure 5:
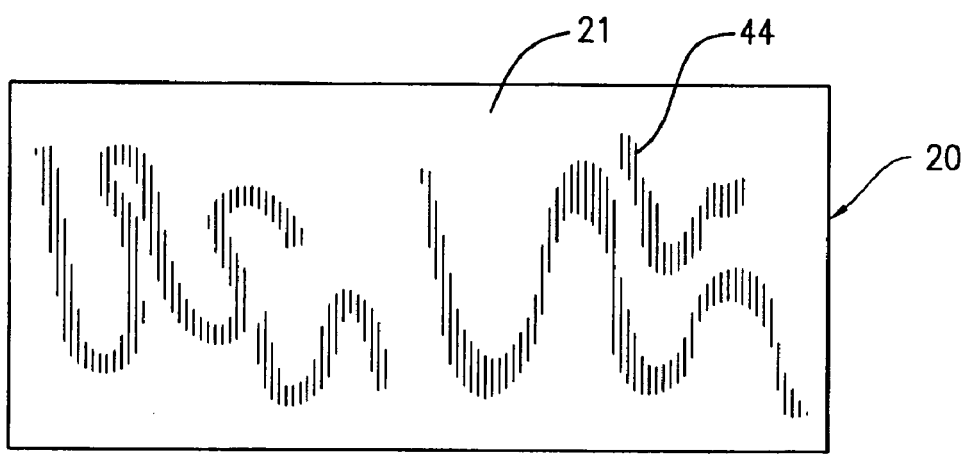
FIG. 5 is a front elevation view of the imaging plate displaying an image produced within the photographic imaging apparatus upon exposure to light.

Referring to FIG. 5, the oxidative plate 20 of FIG. 5 is shown having an image 44 imprinted on the surface 21 thereof. The image was generated by a 100-watt light bulb, and in this example shows interference bands generated by a 60 Hz, 110 AC, voltage applied to the light bulb (not shown).

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. A photographic imaging apparatus, comprising:
    a housing defining an interior cavity;
    an opening at one end of the housing to allow light to enter the interior cavity; and
    a photographic imaging substrate located within the interior cavity opposite from the opening, the photographic imaging substrate including:
        a light passing substrate;
        a photosensitive agent capable of producing oxygen in the presence of light, the photosensitive agent being supported on the light passing substrate away from said opening, and exposable to light passing through the light passing substrate from the opening; and
        an oxidizable surface positioned in close association with the photosensitive agent, the oxidizable surface being chemically reactive in the presence of oxygen produced by the photosensitive agent to yield a visual change in the form of an image.

2. The photographic imaging apparatus of claim 1, further comprising a precursor gas supply for supplying to the photosensitive agent a precursor gas consumable by the photosensitive agent for the production of oxygen.

3. The photographic imaging apparatus of claim 2, wherein the precursor gas is a combination of carbon dioxide and water vapor.

4. The photographic imaging apparatus of claim 3, wherein the precursor gas supply is composed of carbonated water.

5. The photographic imaging apparatus of claim 1, wherein the oxidizable surface is composed of a material selected from a group consisting of an oxidizable metal and alloys thereof.

6. The photographic imaging apparatus of claim 5, further comprising an electron source in electrical communication with the oxidizable surface for facilitating oxidation in the presence of oxygen.

7. The photographic imaging apparatus of claim 5, wherein the oxidizable metal is iron.

8. The photographic imaging apparatus of claim 1, wherein the light passing substrate is selected from the group consisting of transparent glass and plastic.

9. The photographic imaging apparatus of claim 1, wherein the photosensitive agent is chlorophyll.

10. A photographic imaging substrate, comprising:
    a light passing substrate;
    a photosensitive agent capable of producing oxygen in the presence of light, the photosensitive agent being supported on the light passing substrate, and exposable to light after it passes through the light passing substrate; and
    an oxidizable surface positioned in close association with the photosensitive agent, the oxidizable surface being chemically reactive in the presence of oxygen produced by the photosensitive agent to yield a visual change in the form of an image.

11. The photographic imaging substrate of claim 10, wherein the light passing substrate is selected from the group consisting of transparent glass and plastic.

12. The photographic imaging substrate of claim 10, wherein the photosensitive agent is chlorophyll.

13. The photographic imaging substrate of claim 10, wherein the oxidizable surface is composed of a material selected from a group consisting of an oxidizable metal and alloys thereof.

14. The photographic imaging substrate of claim 13, further comprising an electron source in electrical communication with the oxidizable surface for facilitating oxidation in the presence of oxygen.

15. The photographic imaging substrate of claim 13, wherein the oxidizable metal is iron.

16. A method of producing a photographic image, comprising:
    placing a photosensitive agent capable of producing oxygen in the presence of light on a light passing substrate;
    positioning the photosensitive agent in sufficient proximity to and in atmospheric communication with a corresponding oxidizable surface wherein the oxidizable surface is chemically reactive in the presence of oxygen to yield a visual change; and
    exposing the photosensitive agent to light that has passed through the light passing substrate for a sufficient time to generate an image in the oxidizable surface.

17. The method of claim 16, wherein the photosensitive agent is chlorophyll.

18. The method of claim 16, wherein the oxidizable surface is selected from a group consisting of an oxidizable metal and alloys thereof.

19. The method of claim 18, wherein the oxidizable metal is iron.

20. The method of claim 18, further comprising supplying an electrical current through the oxidizable surface.

21. The method of claim 16, further comprising supplying to the photosensitive agent a precursor gas consumable by the photosensitive agent for the production of oxygen.

22. The method of claim 17, further comprising supplying to chlorophyll sufficient amounts of carbon dioxide and water vapor to drive photosynthetic oxygen production.

* * * * *